United States Patent [19]

Coffenberry

[11] Patent Number: 4,974,685

[45] Date of Patent: Dec. 4, 1990

[54] FREEZE PLUG INSTALLATION TOOL

[75] Inventor: Norman D. Coffenberry, Florence, Ky.

[73] Assignee: SDI Operating Partners, L.P., Philadelphia, Pa.

[21] Appl. No.: 405,514

[22] Filed: Sep. 11, 1989

[51] Int. Cl.⁵ .............................................. B23B 45/16

[52] U.S. Cl. ....................................... 173/128; 29/275

[58] Field of Search ................. 173/128, 132, 133, 90; 227/146, 147, 156; 29/275, 277

[56] References Cited

U.S. PATENT DOCUMENTS 2,272,760 2/1942 Allen .
2,325,728 8/1943 Allen .
2,783,670 3/1957 Graves et al. .
3,064,342 11/1962 Wagoner .
3,208,134 9/1965 Krewson, Jr. .
3,827,509 8/1974 Larson .
4,229,870 10/1980 Tate .
4,341,004 7/1982 Echols .
4,459,730 7/1984 Echols .
4,514,890 5/1985 Stewart .
4,545,440 10/1985 Treadway ........................... 173/132
4,586,228 5/1986 Rodolf .
4,637,115 1/1987 Hillock .
4,637,539 1/1987 Turcott et al. ................. 173/128 X
4,646,852 3/1987 Cotta .................................. 173/128
4,646,857 3/1987 Cotta .

*Primary Examiner*—Douglas D. Watts
*Assistant Examiner*—Willmon Fridig
*Attorney, Agent, or Firm*—Wood, Herron & Evans

[57] ABSTRACT

An installation tool for installing a cup-shaped freeze plug in an engine block's bore. A reciprocable hammer nose connectable to a power source repetitively hammers the freeze plug to drive it into the bore. One feature includes a hammer stroke adjustment system which permits the stroke depth of the hammer nose into the block's bore to be adjusted by the tool's user in order to seat the plug at a pre-determined depth in the bore. Another feature includes a housing particularly sized and configure to cooperate with a freeze plug of the type having a minor diameter base section adapted to be slip fit into the block's bore and a major diameter rim section adapted to be pres fit into the bore, the plug's rim being received internally of the housing when the plug's base is slip fit into the bore, and when the housing is engaged with the outer surface of the engine block so as to align the plug and the tool and the bore properly prior to hammering the plug's rim into the bore.

21 Claims, 2 Drawing Sheets

FREEZE PLUG INSTALLATION TOOL

This invention relates to impact tools. More particularly, this invention relates to an impact tool for installing a freeze plug in a bore of an engine block.

The engine block for an internal combustion engine is typically provided with at least one bore which communicates between the engine's coolant system and the block's exterior surface. This bore is closed by a plug known as a freeze plug. The purpose of the freeze plug is to prevent the engine block from cracking in the event the liquid coolant within the engine block freezes, e.g., during the winter season. Specifically, the freeze plug is sized to be friction fit into the engine block's bore, and it is intended that the freeze plug pop out if the liquid coolant within the engine block freezes. In other words the liquid coolant would normally expand and crack the engine block if no freeze plug was present to pop out and relieve the expansion stresses.

It is periodically necessary to replace the freeze plugs in an engine block, whether that replacement is due to the freeze plug rusting or weakening or other reasons. One of the most common freeze plugs known to the prior art is a cup-shaped freeze plug. Typically a new cup-shaped freeze plug is inserted into an engine block's bore by hand with use of a hammer. Specifically, the cup-shaped freeze plug is placed against the bore, a punch is then held by the user's one hand against the freeze plug, and the user's other hand then drives the punch against the freeze plug to force it into the bore through use of the hammer. This manual freeze plug installation method has a couple of serious disadvantages. First, it is quite difficult for the installer to keep the plug square with the engine block's bore. This for the reason the mechanic must hold the punch in one hand and the hammer in the other with no method of keeping the plug in place. Second, it is difficult to keep the insertion depth of the prior art freeze plug within an engine block's bore from one block to another. This for the reason there is no fixed control over the freeze plug insertion depth with the manual installation method.

Accordingly, it has been one objective of this invention to provide an improved installation tool for installing a cup-shaped freeze plug in an engine block's bore which includes a hammer nose that is powered in repetitive hammer strokes by a detachable power source.

It has been another objective of this invention to provide an improved installation tool for installing a cup-shaped freeze plug where the tool includes a hammer stroke length adjustment system which permits the depth of the tool's hammer nose to be adjusted as desired by the tool's user in order to seat the plug at that depth in the bore desired by the tool's user time after time.

It has been a further objective of this invention to provide an improved installation tool for a cup-shaped freeze plug which includes a housing particularly sized and configured to cooperate with a plug of the type having a minor diameter base section adapted to be slip fit into the bore, and a major diameter rim section adapted to be press fit into the bore, the housing being sized and configured adjacent its operative face to receive the plug's rim section internally of the housing when the plug's base section is slip fit in the bore, and when the housing is engaged with the outer surface of the engine block, so as to align the plug and the tool and the bore properly prior to hammering the plug's rim section, and therefor the plug, into the bore.

Other objectives and advantages of this invention will be more apparent from the following detailed description taken in conjunction with the drawings in which.

Figure 1:
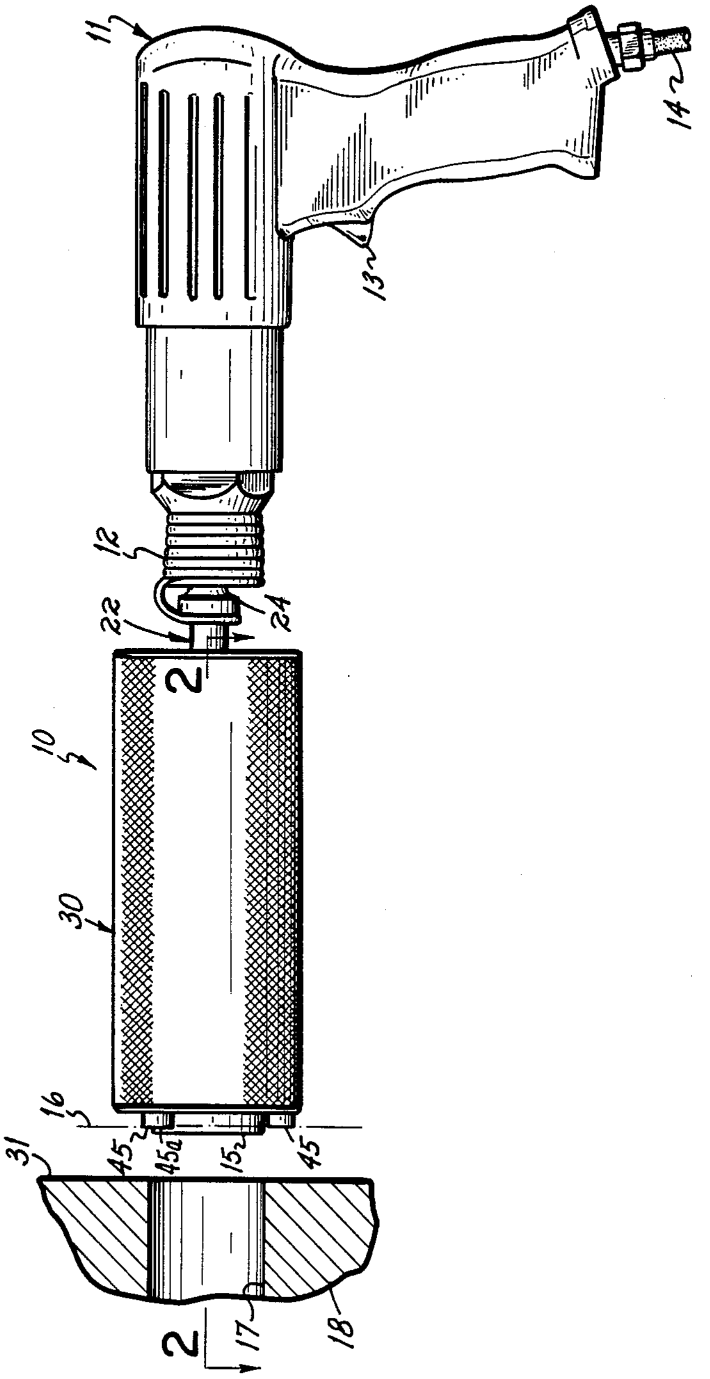
FIG. 1 is a side elevation view illustrating a pneumatic chisel gun in combination with a freeze plug installation tool in accord with the principles of this invention.

The freeze plug installation tool 10 of this invention is illustrated in FIG. 1 in an operational attitude. As shown in that figure, the installation tool 10 is connected with a power source in the form of a pneumatic chisel gun 11. The pneumatic chisel gun 11 is interconnected with the installation tool by a spring connector 12 of any type well known to the art. The pneumatic chisel gun 11 is a commercial product readily available, is controlled by an operator's one hand through use of trigger 13 and is pneumatically powered through air hose 14. The freeze plug installation tool 10 is shown in installation readiness in FIG. 1, a cup-shaped freeze plug 15 being inserted at the tool's operative face 16 ready for installation in a bore 17 of an engine block 18.

Figure 2:
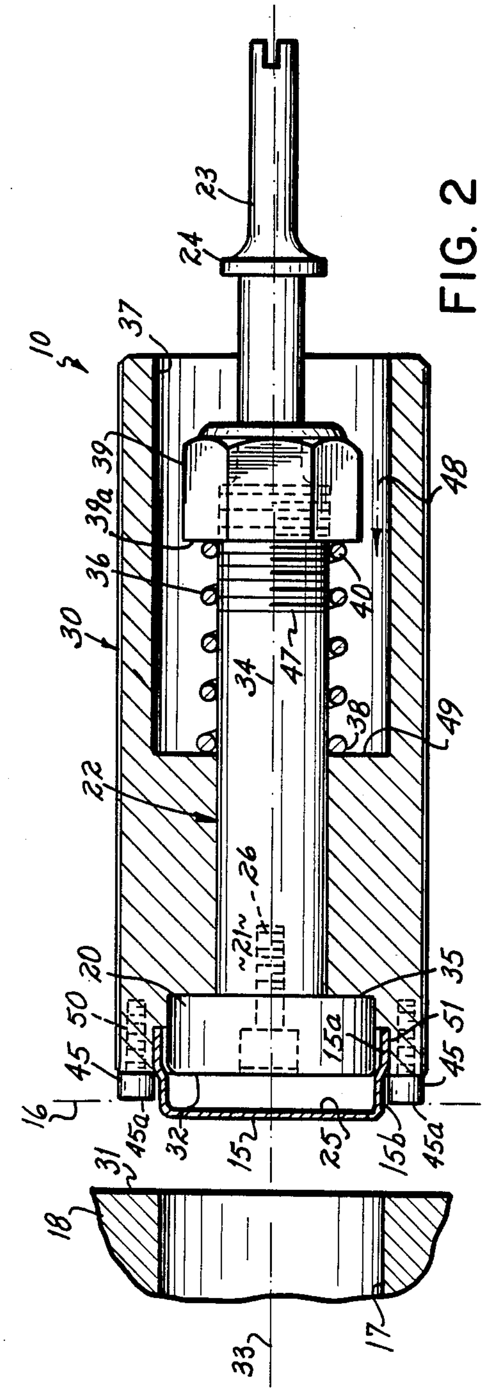
FIG. 2 is a cross-sectional view taken along line 2—2 of FIG. 1, same showing the installation tool and freeze plug in an intermediate assembly position with an engine block's bore.
Figure 3:
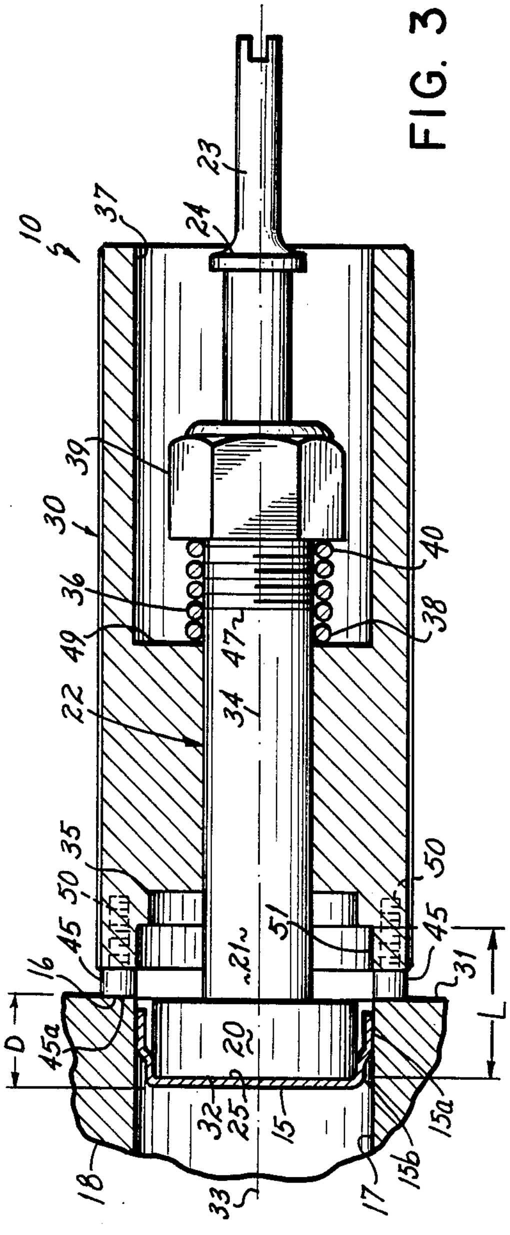
FIG. 3 is a cross-sectional view similar to FIG. 2, but showing the installation tool and freeze plug in a final assembly position with the engine block's bore.

The structural features of the freeze plug installation tool 10 are particularly illustrated in FIGS. 2 and 3. As shown therein, the tool includes a hammer nose 20 connected to one end 21 of a driver shaft 22. The driver shaft 22 is connectable at its other end 23 to the power source, i.e., to the pneumatic chisel gun 11. The driver shaft's other end 23 is provided with a collar 24 that cooperates with the pneumatic chisel gun's spring connector 12 as illustrated in FIG. 1 so as to drivingly connect the pneumatic chisel gun 11 with the driver shaft 22. The hammer nose 20 is driven in repetitive hammer strokes so as to drive the freeze plug 15 into the engine block's bore 17, the hammer nose being sized to contact only the internal floor 25 of the freeze plug 15. Note the hammer nose 20 is connected to the driver shaft 22 by a bolt 26. This allows different size hammer noses 20 to be interchanged with the driver shaft 22 depending on the size freeze plug 15 to be installed in an engine block's bore 17.

The driver shaft 22 is reciprocably carried in a housing 30. The housing 30 defines an operative face 16 at one end adapted to engage continuously the outer face 31 of engine block 18 during installation of the freeze plug 15 into the bore 17. The striking surface 32 of the hammer nose 20 is reciprocable through the housing's operative face 16 in a maximum hammer stroke length L (FIG. 3) that extends between a fully retracted storage position internally of the housing 30 and externally of the bore 17 (as shown in FIG. 2), and a fully extended striking position externally of the housing and internally of the bore (as shown in FIG. 3), when the housing 30 is engaged with the outer surface 31 of the engine block 18, and when the axis 33 of the bore 17 adjacent the block's outer surface 31 is co-axial with the axis 34 of the hammer strokes, during installation of the plug 15 in the bore.

A stop seat 35 is formed in the housing 30, the hammer nose 20 being located in the stop seat to establish its fully retracted storage position. A return spring 36 trapped between bottom surface 49 of counterbore 37 of the housing 30 at one end 38 and adjustment nut 39 at the other end 40, and co-axial with the driver shaft 22, continuously biases the hammer nose 20 to the fully retracted storage position shown in FIG. 2.

A hammer stroke length adjustment system is connected with the hammer nose 20. The adjustment system permits the depth L of the hammer nose stroke into the bore to be adjusted within limits as desired by the tool's user in order to seat the freeze plug 15 at that depth in the bore desired by the tool's user. This adjustment system includes two different abutments connected to the tool, one of the abutments being adjustment nut 39 and the other of the abutments being adjustment feet 45. Each of these abutments 39, 45 defines a locator surface **39*a*, 45*a* that is movable relative to the stroke axis 34 of the hammer nose 20 when the hammer nose is stationary, i.e., when the hammer nose is in the FIG. 2 or fully retracted storage position. The position of the locator surface 39*a*, 45*a* thereby determines the depth D of the hammer nose 20 stroke into the bore 17. More particularly, the adjustment nut 39 mounted on the driver shaft 22 is threadedly connected thereto as at 47 so it can be moved to a desired operative longitudinal position on that shaft. During use of the tool, the adjustment nut 39 is stopped from further downstroke movement in direction shown by phantom arrow 48 when it has fully compressed return spring 36 against surface 49 in order to establish the fully extended striking position of the hammer nose 20 as shown in FIG. 3, thereby determining the depth D of the hammer nose stroke into the bore. So adjusting the position of the adjustment nut 39 on the driver shaft 22 is one way of controlling the hammer stroke length L of the hammer nose 20**.

The second abutment of the hammer stroke adjustment system is part of the housing 30, and is in the form of the three adjustment feet 45 circumferentially disposed around the housing. These three adjustment feet 45 are each in the form of a bolt threadedly engaged with the housing's hammer nose end as at 50, those three feet defining the housing's operative face 16. The adjustable feet 45 are movable toward or away from the housing 11 because they are threaded therewith, the fully retracted storage position of the hammer nose 20 being extended toward or retracted from the housing's operative face 16 depending on whether the feet are moved toward or away from the housing. Thus, the feet 45 also function to aid in determining the depth D of the hammer stroke into the engine block's bore 17 when the housing 11 is operatively engaged with the engine block's surface 31 as shown in FIG. 3. Note the feet 45 are positioned on the exterior periphery of an annular cavity 51 defined in the housing's hammer nose end which surrounds the hammer nose 20 itself. This annular cavity 51 receives rim section **15*a* of the cup-shaped freeze plug, thereby properly orienting the freeze plug on the hammer nose during installation of the freeze plug with the engine block 18. Thus, the adjustable feet 45 also provide an alignment or locator function for holding the cup-shaped plug 15 in appropriate alignment with the engine block's bore 17 during installation. Further, the adjustable feet 45 also are individually adjustable relative one to the other so as to function as a hammer stroke alignment system. This allows the installation tool 10 to be oriented so that the driver shaft's reciprocatory hammer stroke axis 34 is co-axial with the engine block bore's axis 33 even if the engine block's outer surface 31** is oriented at an angle relative to the engine block bore's axis.

The installation tool 10 of this invention is particularly adapted for use with a cup-shaped freeze plug 15 of a special configuration. More particularly, and as illustrated in FIGS. 2 and 3, the cup-shaped freeze plug 15 is of the type having a major diameter rim section **15*a* adapted to be press fit into the bore 17, and a minor diameter base section 15*b* adapted to be slip fit into the engine block's bore. In a preliminary step, and as particularly shown in FIG. 2, with this special cup-shaped freeze plug 15 in place on the installation tool's hammer nose 20, the tool 10 itself then slip fits the freeze plug's minor diameter base section 15*b* in preliminary fashion into the engine block's bore 17 before the pneumatic chisel gun is activated. The pneumatic chisel gun 11 is then activated with hammer nose 20 repeatedly striking against the internal floor 25 of the cup-shaped plug's base section 15*b* until the plug 15 is fully seated within the engine block's bore 17 as shown in FIG. 3** (which occurs after the hammer nose has reached the fully extended striking position shown in that figure as determined by the adjustment nut and the position of adjustable feet).

In use, the tool's housing 30 is easy to manually grip on its outer surface (which is knurled) with the user's one hand, and the user's other hand then controls the pneumatic chisel gun's trigger 13. With this tool 10, and with the special two diameter cup-shaped freeze plug 15 illustrated, no other guidance is needed, either manual or otherwise, for properly orienting and holding the freeze plug in proper alignment with the engine block's bore 17 during installation thereof.

Having described in detail the preferred embodiment of my invention, what I desire to claim and protect by Letters Patent is:

1. A freeze plug installation tool for installing a cup-shaped freeze plug in a bore of an engine block, said freeze plug being of the type having a minor diameter base section adapted to be slip fit in said bore and a major diameter rim section adapted to be press fit in said bore, said tool comprising a hammer nose connected to one end of a driver shaft, said driver shaft being connectable to a power source for reciprocating said nose in repetitive hammer strokes, a housing within which said driver shaft is reciprocably carried, said housing defining an operative face at one end adapted to engage continuously the outer surface of said engine block during installation of said freeze plug in said bore, the striking surface of said hammer nose being reciprocable through said operative face in a hammer stroke length between a fully retracted storage position internally of said housing and externally of said bore, and a fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, and said housing being sized and configured adjacent said operative face to receive said plug's rim section internally of said housing when said plug's base section is slip fit in said bore, and when said housing is engaged with the outer surface of said engine block, prior to hammering said plug's rim section into said bore.

2. A freeze plug installation tool as claimed in claim 1, said tool comprising a return spring connected between said driver shaft and said housing, said return spring continuously biasing said hammer nose to said fully retracted storage position.

3. A freeze plug installation tool as set forth in claim 2, said tool comprising a stop seat formed in said housing, said hammer nose being positioned in said stop seat to establish said fully retracted storage position.

4. A freeze plug installation tool as set forth in claim 1, said tool comprising a hammer stroke adjustment system connected with said hammer nose, said adjustment system permitting the depth of said hammer nose into said bore to be adjusted as desired by the tool's user in order to seat said plug at that depth in said bore desired by the tool's user.

5. A freeze plug installation tool as set forth in claim 4, said adjustment system comprising an abutment connected to said tool, said abutment defining a locator surface that is longitudinally movable when said hammer nose is stationary relative to the stroke axis of said hammer nose, the position of said locator surface thereby determining the depth of said hammer nose stroke into said bore.

6. A freeze plug installation tool as set forth in claim 5, said abutment comprising an adjustment nut mounted on said driver shaft, said nut being movable to a desired operative position on said shaft, said nut being stopped from further movement by said housing during use of said tool to establish said fully extended striking position, thereby determining the depth of said hammer nose stroke into said bore.

7. A freeze plug installation tool as set forth in claim 5, said abutment comprising an adjustable foot carried as part of said housing, said foot cooperating to define said operative face, said foot being movable toward or away from said housing, said fully retracted storage position of said hammer nose being extended toward or retracted from said operative face depending on whether foot is moved toward or away from said housing, thereby also determining the depth of said hammer nose stroke into said bore.

8. A freeze plug installation tool as set forth in claim 1, said tool comprising a hammer stroke alignment system connected with said hammer nose, said alignment system permitting the axis of each hammer stroke to be aligned with the axis of said bore during use of said tool when said housing's operative face is engaged with the outer surface of said engine block.

9. A freeze plug installation tool as set forth in claim 8, said tool comprising at least three feet carried as part of said housing, said feet cooperating to define said operative face, at least one of said feet being movable toward or away from said housing so that when said operative face is engaged with said engine block said hammer stroke axis will be co-axial with said block's bore.

10. A freeze plug installation tool as set forth in claim 1, said tool comprising a releasable connector by which said hammer nose is connected to said driver shaft, said releasable connector permitting hammer noses of different sizes to be connected with said driver shaft in order to install different size freeze plugs in different size bores.

11. A freeze plug installation tool for installing a cup-shaped freeze plug in a bore of an engine block, said tool comprising a hammer nose connected to one end of a driver shaft, said driver shaft being connectable to a power source for reciprocating said nose in repetitive hammer strokes, a housing within which said driver shaft is reciprocably carried, said housing defining an operative face at one end adapted to engage continuously the outer surface of said engine block during installation of said freeze plug in said bore, the striking surface of said hammer node being reciprocable through said operative face in a hammer stroke length between a fully retracted storage position internally of said housing and externally of said bore, and a fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, a return spring connected between said driver shaft and said housing, said return spring continuously biasing said hammer nose to said fully retracted storage position, and a hammer stroke adjustment system connected with said hammer nose, said adjustment system permitting the depth of said hammer nose stroke into said bore to be adjusted as desired by the tool's user in order to seat said plug at that depth in said bore desired by the tool's user.

12. A freeze plug installation tool as claimed in claim 11, said tool comprising a stop seat formed in said housing, said hammer nose being positioned in said stop seat to establish said fully retracted storage position.

13. A freeze plug installation tool for installing a cup-shaped freeze plug in a bore of an engine block, said tool comprising a hammer nose connected to one end of said driver shaft, said driver shaft being connectable to a power source for reciprocating said nose in repetitive hammer strokes, a housing within which said driver shaft is reciprocably carried, said housing defining an operative face at one end adapted to engage continuously the outer surface of said engine block during installation of said freeze plug in said bore, the striking surface of said hammer nose being reciprocable through said operative face in a hammer stork length between a fully retracted storage position internally of said housing and externally of said bore, and a fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, and a hammer stroke adjustment system connected with said hammer nose, said adjustment system permitting the depth of said hammer nose stroke into said bore to be adjusted as desired by the tool's user in order to seat said plug at that depth in said bore desired by the tool's user, said adjustment system comprising an abutment connected to said tool, said abutment defining a locator surface that is longitudinally movable when said hammer nose is stationary relative to the stroke axis of said hammer nose, the position of said locator surface thereby determining the depth of said hammer nose stroke into said bore.

14. A freeze plug installation tool as claimed in claim 13, said abutment comprising an adjustment nut mounted on said driver shaft, said nut being movable to a desired operative position on said shaft, said nut being stopped from further movement by said housing during use of said tool to establish said fully extended striking position, thereby determining the depth of said hammer nose stroke into said bore.

15. A freeze plug installation tool as claimed in claim 13, said abutment comprising an adjustable foot carried as part of said housing, said foot cooperating to define said operative face, said foot being movable toward or away from said housing, said fully retracted storage position of said hammer nose being extended toward or retracted from said operative face depending on whether foot is moved toward or away from said housing, thereby also determining the depth of said hammer nose stroke into said bore.

16. A freeze plug installation tool for installing a cup-shaped freeze plug in a bore of an engine block, said tool comprising a hammer nose connected to one end of a driver shaft, said driver shaft being connectable to a power source for reciprocating said nose in repetitive hammer strokes, a housing within which said driver shaft is reciprocably carried, said housing defining an operative face at one end adapted to engage continuously the outer surface of said engine block during installation of said freeze plug in said bore, the striking surface of said hammer nose being reciprocable through said operative face in a hammer stroke length between a fully retracted storage position internally of said housing and externally of said bore, and a fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, a hammer stroke adjustment system connected with said hammer nose, said adjustment system permitting the depth of said hammer nose stroke into said bore to be adjusted as desired by the tool's user in order to seat said plug at that depth in said bore desired by the tool's user, and a hammer stroke alignment system connected with said hammer nose, said alignment system permitting the axis of said hammer stroke to be aligned with the axis of said bore during use of said tool when said housing's operative face is engaged with the outer surface of said engine block, and when at least a portion of that outer surface is not perpendicular to the axis of said bore.

17. A freeze plug installation tool as claimed in claim 16, said alignment system comprising at least three feet carried as part of said housing, said feet cooperating to define said operative face, at least one of said feed being movable toward or away from said housing so that when said operative face is engaged with said engine block said hammer stroke axis will be co-axial with said block's bore.

18. A freeze plug installation tool for installing a cup-shaped freeze plug in a bore of an engine block, said tool comprising a hammer nose connected to one end of a driver shaft, said driver shaft being connectable to a power source for reciprocating said nose in repetitive hammer strokes, a releasable connector by which said hammer nose is connected to said driver shaft, said releasable connector permitting hammer noses of different sizes to be connected with said driver shaft in order to install different size freeze plugs in different size bores, a housing within which said driver shaft is reciprocably carried, said housing defining an operative face at one end adapted to engage continuously the outer surface of said engine block during installation of said freeze plug in said bore, the striking surface of said hammer noze being reciprocable through said operative face in a hammer stroke length between a fully retracted storage position internally of said housing and externally of said bore, and a fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, and a hammer stroke adjustment system connected with said hammer nose, said adjustment system permitting the depth of said hammer nose stroke into said bore to be adjusted as desired by the tool's user in order to seat said plug at that depth in said bore desired by the tool's user.

19. A freeze plug installation tool for installing a cup-shaped freeze plug in a bore of an engine block, said tool comprising a hammer nose connected to one end of a driver shaft, said driver shaft being connectable to a power source for reciprocating said nose in repetitive hammer strokes, a housing within which said driver shaft is reciprocably carried, said housing defining an operative face at one end adapted to engage continuously the outer surface of said engine block during installation of said freeze plug in said bore, the striking surface of said hammer nose being reciprocable through said operative face in a hammer stroke length between a fully retracted storage position internally of said housing and externally of said bore, and fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, said housing being sized and configured adjacent said operative face to receive said plug's rim section internally of said housing when said plug's base section is slip fit in said bore, and when said housing is engaged with the outer surface of said engine block, prior to hammering said plug's rim section into said bore, and a hammer stroke adjustment system connected with said hammer nose, said adjustment system permitting the depth of said hammer nose stroke into said bore to be adjusted as desired by the tool's user in order to seat said plug at that depth in said bore desired by the tool's user.

20. A method of installing a cup-shaped freeze plug in a bore of an engine block, said method using a freeze plug installation tool having a hammer nose connected to one end of a driver shaft, said driver shaft being connectable to a power source for reciprocating said nose in repetitive hammer strokes, said method comprising the steps of providing a housing within which said driver shaft is reciprocably carried, said housing defining an operative face at one end adapted to engage continuously the outer surface of said engine block during installation of said freeze plug in said bore, reciprocating the striking surface of said hammer nose through said operative face in a hammer stroke length between a fully retracted storage position internally of said housing and externally of said bore, and a fully extended striking position externally of said housing and internally of said bore, when said housing is engaged with the outer surface of said engine block, and when the axis of said bore adjacent said block's outer surface is aligned with the axis of said hammer strokes, during installation of said plug in said bore, and adjusting the depth of said hammer nose stroke into said bore as desired by the tool's user in order to seat said plug at that depth in said bore desired by the tool's user.

21. A method of installing a cup-shaped freeze plug in a bore of an engine block said method using a freeze plug installation tool having a hammer nose connected to one end of a driver shaft, said method comprising the steps of sizing said hammer nose to receive said plug in slip fit relation thereon prior to installation in said bore, connecting a power tool connectable to the other end of said driver shaft, and continuously reciprocating said hammer nose in repetitive hammer strokes against the internal floor of said freeze plug in order to install said freeze plug in said bore.

* * * * *

UNITED STATES PATENT AND TRADEMARK OFFICE
CERTIFICATE OF CORRECTION

PATENT NO. : 4,974,685

DATED : December 4, 1990

INVENTOR(S) : Norman D. Coffenberry

It is certified that error appears in the above-identified patent and that said Letters Patent is hereby corrected as shown below:

In Column 6, line 61 "hammer stork" should be changed to read --hammer stroke--

In Column 8, line 9 "at least one of said feed" should be changed to read --at least one of said feet--

Signed and Sealed this

Sixth Day of October, 1992

*Attest:*

DOUGLAS B. COMER

*Attesting Officer*

*Acting Commissioner of Patents and Trademarks*